(12) United States Patent
Miehl et al.

(10) Patent No.: US 10,243,606 B1
(45) Date of Patent: Mar. 26, 2019

(54) PORTABLE COMMUNICATIONS DEVICE WITH TACTILITY ELEMENT

(71) Applicant: MOTOROLA SOLUTIONS, INC., Chicago, IL (US)

(72) Inventors: Andrew P. Miehl, Boca Raton, FL (US); Ido Amit, Boynton Beach, FL (US); Giorgi Bit-Babik, Plantation, FL (US); Antonio Faraone, Fort Lauderdale, FL (US); Brad J. Lamirand, Boynton Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/713,135

(22) Filed: Sep. 22, 2017

(51) Int. Cl.
| | |
|---|---|
| *H01H 13/14* | (2006.01) |
| *H04B 1/3827* | (2015.01) |
| *H01Q 1/24* | (2006.01) |
| *H04L 29/06* | (2006.01) |
| *H01H 13/85* | (2006.01) |
| *H04B 1/44* | (2006.01) |

(52) U.S. Cl.
CPC ......... *H04B 1/3827* (2013.01); *H01H 13/14* (2013.01); *H01H 13/85* (2013.01); *H01Q 1/243* (2013.01); *H04L 65/4061* (2013.01); *H04B 1/44* (2013.01)

(58) Field of Classification Search
CPC .............................. H04B 1/3827; H01H 13/14
See application file for complete search history.

(56) References Cited

U.S. PATENT DOCUMENTS

| | | | |
|---|---|---|---|
| 2,513,796 A | 7/1950 | Goddard | |
| 6,529,168 B2 | 3/2003 | Mikkola et al. | |
| 6,545,642 B1 | 4/2003 | Doub et al. | |
| 7,164,387 B2 | 1/2007 | Sievenpiper | |
| 7,639,187 B2 * | 12/2009 | Caballero | H01Q 1/088 343/702 |
| 9,065,170 B2 * | 6/2015 | Lee | H01Q 1/088 |
| 2006/0046794 A1 | 3/2006 | Scherschel et al. | |
| 2016/0322695 A1 | 11/2016 | Claeys et al. | |
| 2017/0352943 A1 * | 12/2017 | Sung | H01Q 1/24 |

FOREIGN PATENT DOCUMENTS

| | | |
|---|---|---|
| CN | 105207688 | 12/2015 |
| DE | 20100389 | 5/2001 |

OTHER PUBLICATIONS

PCT/US2018/047562 International Search Report and Written Opinion of the International Searching Authority dated Nov. 15, 2018 (16 pages).

* cited by examiner

*Primary Examiner* — Tuan H Nguyen
(74) *Attorney, Agent, or Firm* — Michael Best & Friedrich LLP (57) ABSTRACT

A portable communications device includes a housing, a push button disposed along the housing, and an antenna radiating element disposed within the housing and spaced from the push button. The antenna radiating element is configured to be contacted and deflected by the push button to provide a tactile response when the push button is pressed.

20 Claims, 7 Drawing Sheets

PORTABLE COMMUNICATIONS DEVICE WITH TACTILITY ELEMENT

BACKGROUND OF THE INVENTION

Touch screens and similar input mechanisms are often used in small electronics devices, for example, in portable radios and cellular telephones. While touch screens have been widely adopted press buttons that inherently provide tactile feedback may still be desirable.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

In small electronic devices, component-appropriated board space or internal device volume is a valuable commodity. As a consequence, it is prudent to consider design approaches that resolve multiple requirements concurrently. Tactile domes for button switching and antenna radiating elements usually require proximity to the exterior surfaces of the device. Space on the exterior surfaces of a device is often heavily contested by other device features.

Some embodiments provide techniques and architectures to achieve button press tactile feedback, antenna functionality and detection of switch activation in a singular element.

One embodiment provides a portable communications device. In one example, the portable communications device includes a housing, a push button disposed along the housing, and an antenna radiating element disposed within the housing and spaced from the push button. The antenna radiating element is configured to be contacted and deflected by the push button to provide a tactile response when the push button is pressed.

Another embodiment provides a portable communications device. In one example, the portable communications device includes a housing, a printed circuit board disposed within the housing, and a tactility element disposed within the housing. The tactility element has a first side and a second, opposite side. The second side is spaced from the printed circuit board in a first operating state and operatively engages a tuning circuit on the printed circuit board in a second operating state.

Figure 1:
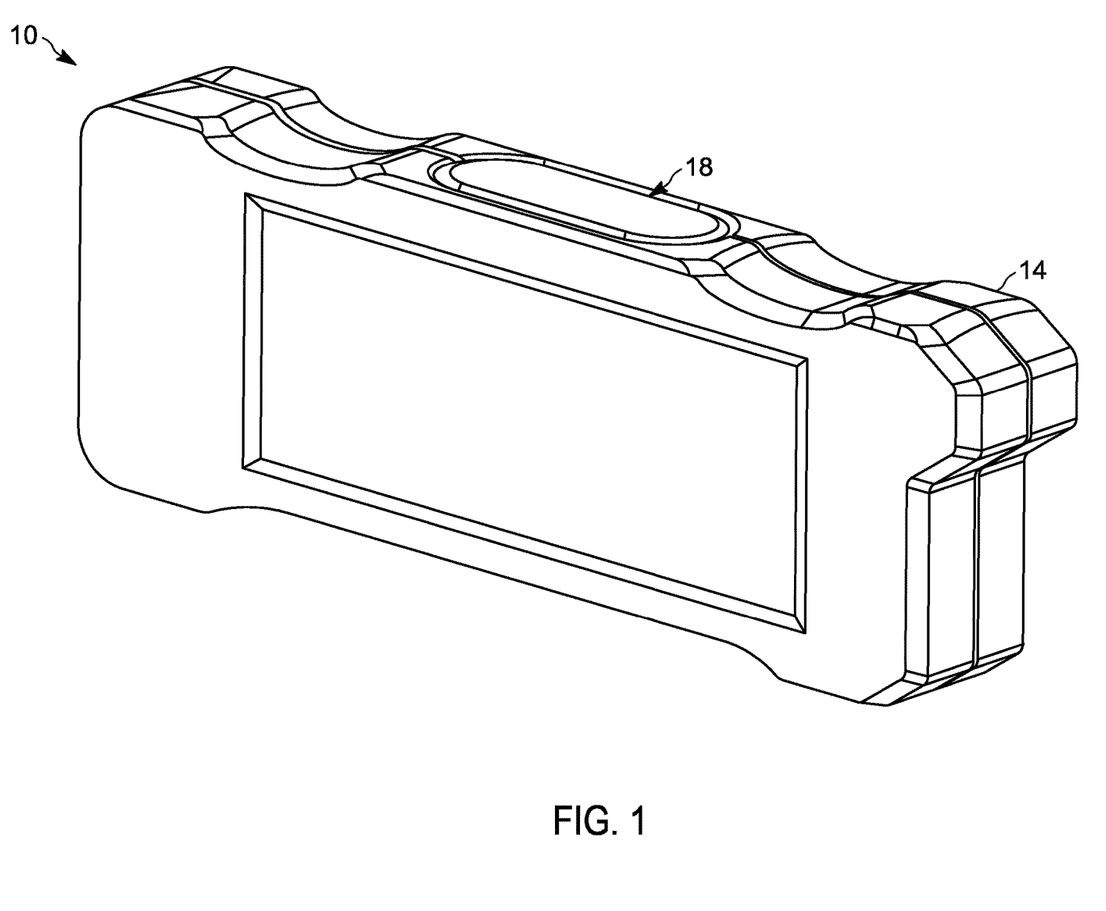
FIG. 1 illustrates a portable communications device in accordance with one embodiment.
Figure 2:
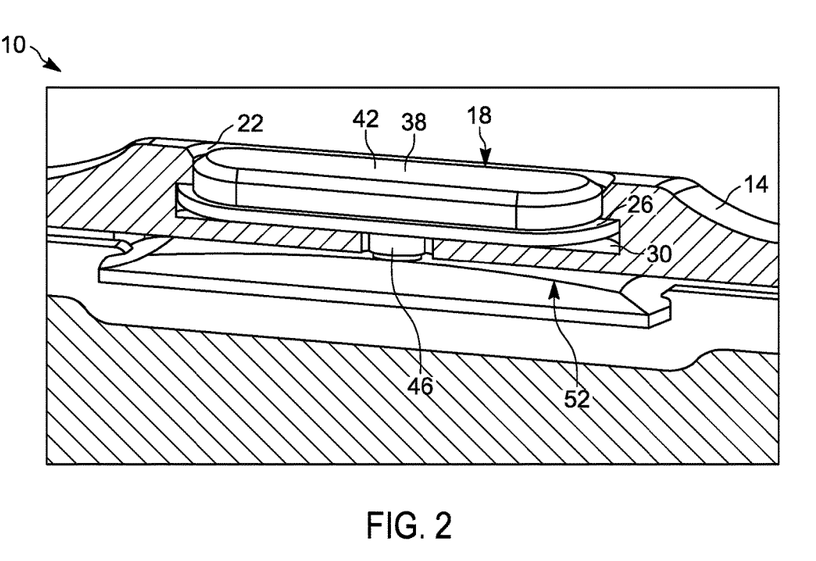
FIG. 2 illustrates a push button of the portable communications device of FIG. 1.
Figure 3:
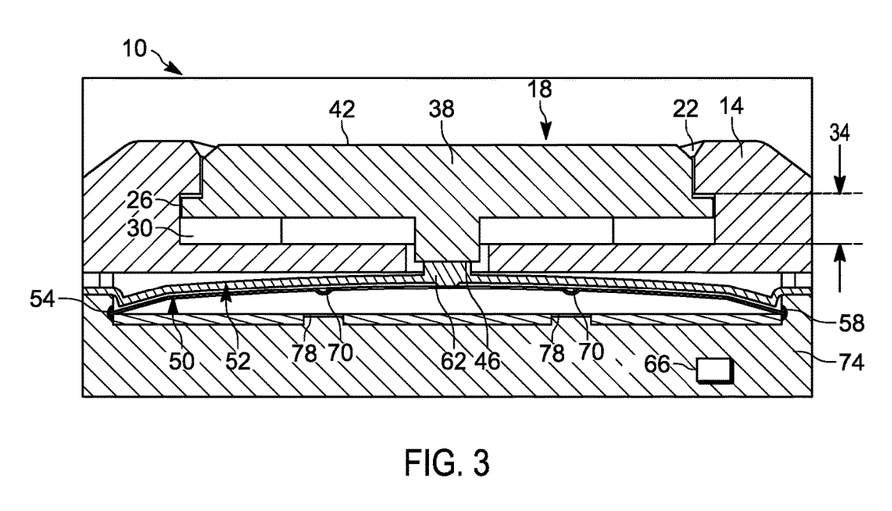
FIG. 3 illustrates a cross-sectional view of the push button and a tactility element.

FIGS. 1-3 illustrate a portable communications device 10. While the portable communications device 10 is described and illustrated as a handheld two-way radio, the portable communications device 10 may be another type of portable communications device, including a cellular telephone, throwable camera, throwable microphone, radio frequency (RF) repeater, and the like.

With reference to FIGS. 1-3, the portable communications device 10 includes a housing 14. In the illustrated embodiment, the housing 14 defines an outer casing or covering (for example made of plastic or other rigid material) for the portable communications device 10. The portable communications device 10 further includes a push button 18 (for example a push-to-talk button) disposed along the housing 14. As illustrated in FIGS. 2 and 3, the housing 14 defines an aperture 22 sized and shaped to receive and hold the push button 18. The push button 18 is generally retained within the aperture 22 via an outer flange 26 of the push button 18 that sits within a groove 30 in the housing 14. In some embodiments, the groove 30 has a height 34 (as seen in FIG. 3) large enough to accommodate an up/down movement of the flange 26 and the push button 18 overall. In some embodiments, the push button 18 is made at least partially of a flexible material (for example an elastomeric material such as an elastomeric rubber), such that at least a portion of the push button 18 may be pressed or otherwise moved from an initial resting position to a flexed position. In the illustrated embodiment, the push button 18 includes a central region 38 that is configured to be pressed by a user's finger or fingers. The central region 38 of the push button 18 includes an outer surface 42 that is contacted by the user's finger or fingers, and a projection 46 disposed beneath the outer surface 42 that is configured to move inwardly into the portable communications device 10 when the push button 18 has been pressed.

With continued reference to FIGS. 1-3, the portable communications device 10 further includes a tactility element 50 disposed within the housing 14, underneath a water seal 52 (for example an elastomeric gasket, O-ring, or other seal). In the illustrated embodiment, the tactility element 50 has a generally dome-shaped structure, although other embodiments include different shapes of structures. As illustrated in FIG. 3, the tactility element 50 includes a first end 54 and a second, opposite end 58. The water seal 52 includes a raised central region 62 disposed directly below the projection 46 of the central region 38 of the push button 18, such that when the user presses on the push button 18, the projection 46 pushes (in a downward direction in FIG. 3) against the raised central region 62, thereby pushing the raised central region 62 against a center of the tactility element 50 and causing a deflection of a center of the tactility element 50 (downwards in FIG. 3). The deflection of the tactility element 50 generates a tactile response (for example in the form of tactile pressure or force). In the illustrated embodiment the tactility element 50 momentarily collapses when the user presses on the push button 18. The tactility element 50 re-assumes its original position and natural state after the user removes his or her finger or fingers (for example the tactility element 50 "snaps" back). In other embodiments, the tactility element 50 may be designed to permanently collapse or otherwise deform after the user has pressed the push button 18 (for example with portable communications devices 10 that are throwable cameras, throwable microphones, or other one-use devices). In some embodiments, the water seal 52 may not be provided, and/or the tactility element 50 itself may include a raised central region that contacts the water seal 52 or the push button 18. In some embodiments, the push button 18 itself may not be provided. Rather, the tactility element 50 may be pressed directly by the operator (e.g., to deflect temporarily or permanently).

In the illustrated embodiment, the tactility element 50 is additionally an antenna radiating element that emits and/or receives radio frequency signals. The tactility element 50 thus acts as a secondary antenna for the portable communications device 10, and is used to emit and/or receive signals for a global positioning system (GPS) within the portable communications device 10. The portable communications device 10 further includes a primary antenna 66 (illustrated schematically in FIG. 3) within the housing 14 that is used separately for push-to-talk features associated with the push button 18. In other embodiments, the tactility element 50 may not be an antenna radiating element, or may emit and/or receive signals other than radio frequency signals. In some embodiments, the tactility element 50 may be used for purposes other than a GPS. For example, the tactility element 50 may be an antenna radiating element that is used to supplement or otherwise boost the radio frequency signals of the primary antenna 66, or may operate in conjunction with other electronics components within the portable communications device 10.

With continued reference to FIGS. 2 and 3, the tactility element 50 includes at least one contact element 70 (e.g., electrical or mechanical contact point or other structure on the tactility element 50). In the illustrated embodiment, the tactility element 50 includes two contact elements 70, one spaced on either side of the raised central region 62 of the tactility element 50. The portable communications device 10 further includes a printed circuit board (PCB) 74 disposed within the housing 14. The printed circuit board 74 includes at least one corresponding contact element 78 (electrical or mechanical) that is aligned to contact the at least one contact element 70 of the tactility element 50 when the tactility element 50 has been deflected. When the contact elements 70, 78 meet, an electrical connection is formed (for example an electrical circuit may become closed, with the tactility element 50 acting as a filament for bridging two or more electrical contacts). The electrical connection may be used for any of a variety of purposes. For example, in some embodiments the electrical connection may be used to activate the primary antenna 66. In some embodiments, a push-to-talk feature may be activated only when the tactility element 50 has been deflected, and the contact(s) 70 on the tactility element 50 has contacted the contact(s) 78 on the printed circuit board 74. In some embodiments, a connection (for example an electrical connection) with the printed circuit board 74 is achieved with a separate, independent, self-contained switching element that is physically contacted or otherwise activated by the downwards deflection of the tactility element 50 (for example causing a light beam to be interrupted, causing a physical element to be moved, and the like). In some embodiments the tactility element 50 is wrapped by a water-tight seal (for example an elastomeric gasket, O-ring, or other seal) around a periphery of the tactility element 50 to prevent water from contacting the contact(s) 70, 78, although other embodiments may not include a seal.

With reference to FIG. 3, the first end 54 of the tactility element 50 defines an antenna launch or feed (for example a location where radio frequency signals are directed into and/or out of the tactility element 50), and the second end 58 of the tactility element 50 defines a termination of the tactility element 50 (for example a free floating end or and end that extends into a region of the printed circuit board 74).

In the illustrated embodiment, the tactility element 50 emits and/or receives radio frequency signals regardless of whether the tactility element 50 has been deflected. Thus, the tactility element 50 serves as an antenna radiating element for the GPS system in the portable communications device 10 at all times when the portable communications device 10 is turned on, or at all times when the GPS system is being used. The tactility element 50 continues to emit and/or receive radio frequency signals when the tactility element 50 has been deflected. In other embodiments, the tactility element 50 may emit and/or receive radio frequency signals (or other signals) only when the tactility element 50 has been deflected, or only when the tactility element 50 is in a non-deflected state. In some embodiments, the tactility element 50 operates as an inverted-F antenna, or another type of antenna or portion thereof (for example as an extension point for radio frequency wavelengths larger than the tactility element 50).

Additionally, other embodiments include different locations for an antenna feed(s) than that illustrated. For example, in some embodiments the antenna feed is located at the second end 58. In other embodiments, the antenna feed is located between the first end 54 and the second end 58 (for example in the raised central region 62 of the tactility element 50), such that the radio frequency signals are fed into the tactility element 50 only when the tactility element has been pressed down and is in contact with the printed circuit board 74. In some embodiments, both the first end 54 and the second end 58 are free-floating ends of the tactility element 50. Other embodiments of the tactility element 50 additionally include various other numbers and locations for contact(s) 70 than that illustrated (for example one electrical contact, two electrical contacts, three electrical contacts and the like).

FIGS. 4-8 illustrate a portable communications device 110. While the portable communications device 110 is described and illustrated as a handheld two-way radio, the portable communications device 110 may be another type of portable communications device, such as those described above.

Figure 6:
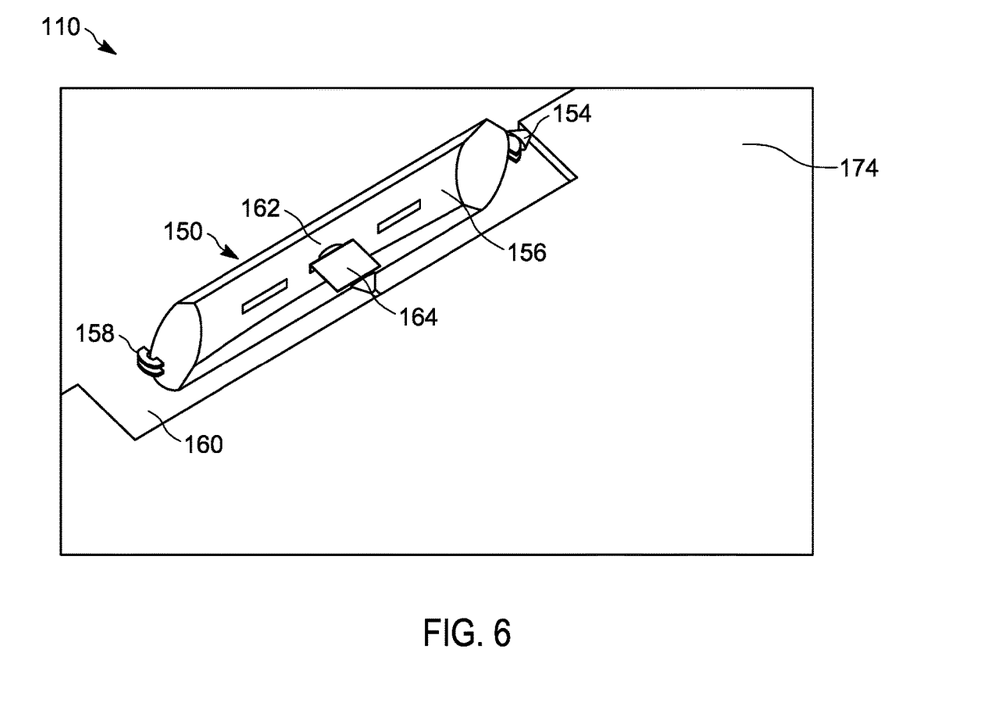
Figure 7:
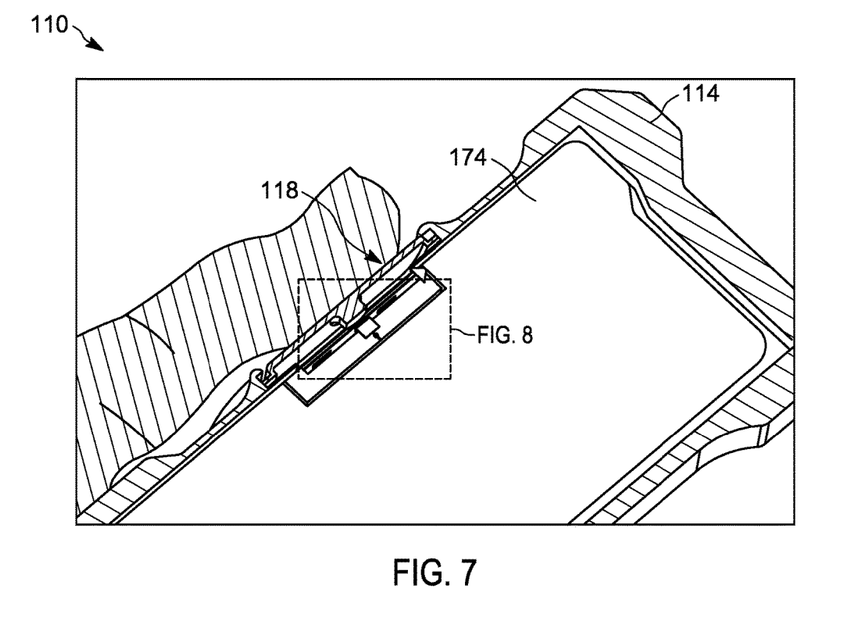
Figure 8:
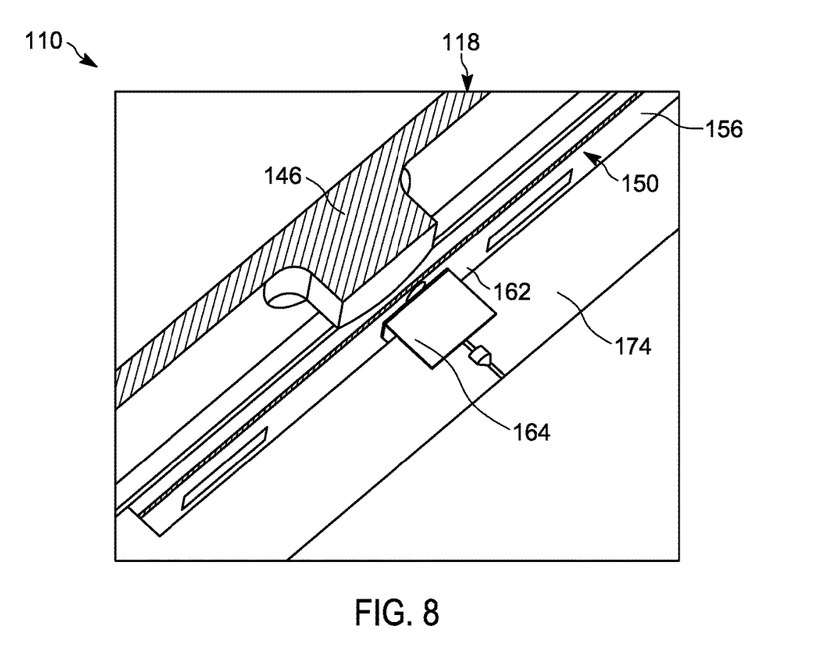

With reference to FIGS. 4-8, the portable communications device 110 includes a housing 114. In the illustrated embodiment, the housing 114 defines an outer casing or covering (for example made of plastic or other rigid material) for the portable communications device 110. The portable communications device 110 further includes a push button 118 disposed along the housing 114. In some embodiments, the push button 118 is made at least partially of a flexible material (for example an elastomeric material such as an elastomeric rubber), such that at least a portion of the push button 118 may be pressed or otherwise moved from an initial resting position to a flexed position. As illustrated in FIG. 8, the push button 118 includes a lower projection 146.

Figure 4:
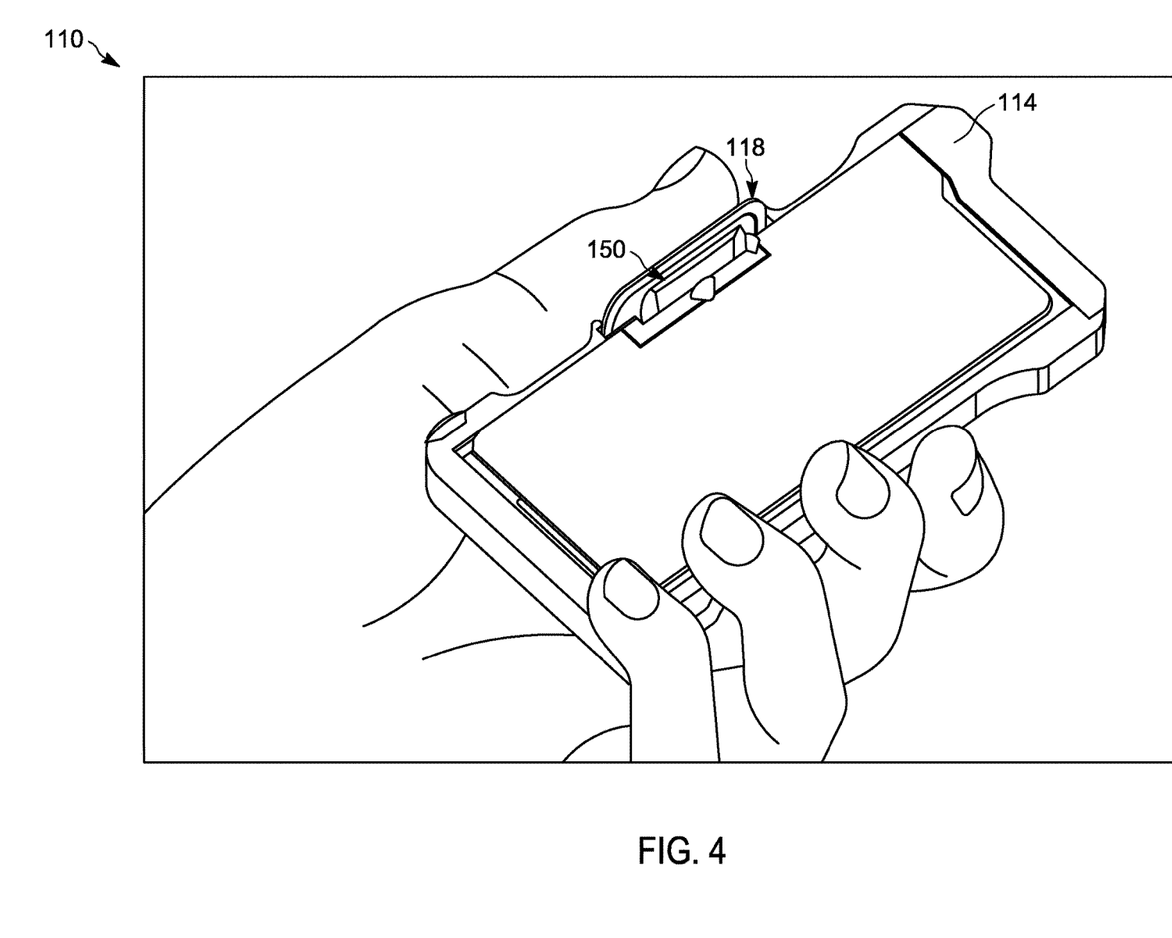
FIG. 4 illustrates a portable communications device in accordance with another embodiment.
Figure 5:
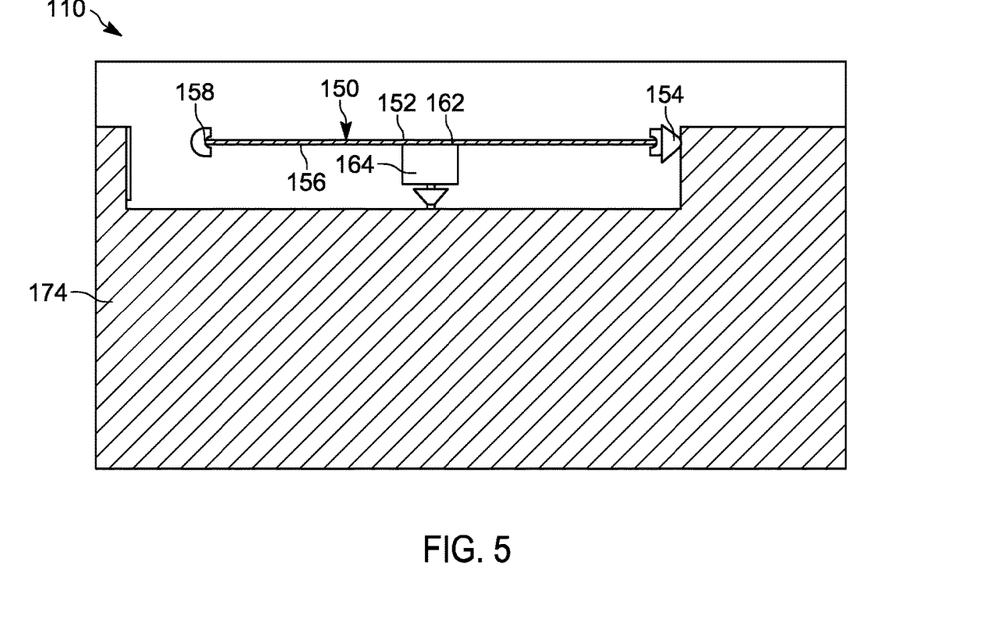
FIGS. 5-8 illustrate a push button and tactility element of the portable communications device of FIG. 4.

With continued reference to FIGS. 4-8, the portable communications device 110 further includes a tactility element 150 disposed within the housing 114. In the illustrated embodiment, the tactility element 150 is an antenna radiating element. As illustrated in FIGS. 5 and 6, the tactility element 150 includes a first end 154, a second, opposite end 158, and a central region 162 disposed between the first end 154 and the second end 158. The first end 154 is coupled directly to a printed circuit board 174 (for example via hard, gold-plated mounting points), and defines an antenna feed (for example to provide radio frequency signals to the tactility element 150). The second end 158 of the tactility element is freely floating (from a radio-frequency perspective) such that a printed circuit board ground clearance 160 exists between the second end 158 and the printed circuit board 174 (e.g., a ground plane of the printed circuit board), but the tactility element 50 is still structurally supported to provide tactility functionality. Similar to the tactility element 50, the tactility element 150 is a secondary antenna for a GPS system (or other system or component) of the portable communications device 110, and emits and/or receives radio frequency signals regardless of whether the push button 118 is pressed. In other embodiments, the tactility element 150 may be an antenna radiating element that is used to supplement or otherwise boost the radio frequency signals of a primary antenna (similar to the antenna 66), or may operate in conjunction with other electronics components within the portable communications device 110.

With reference to FIG. 8, when the push button 118 is pressed, the lower projection 146 of the push button 118 presses on the central region 162 of the tactility element 150, causing a tactile response to the user (for example in the form of tactile pressure or force). In the illustrated embodiment, the central region 162 returns to its original position after the user removes his or her finger or fingers (for example the central region 162 "snaps" back). In other embodiments, the tactility element 150 may be designed to permanently collapse or otherwise deform after the user has pressed the push button 118 (for example with portable communications devices 110 that are throwable cameras, throwable microphones, or other one-use devices). In the illustrated embodiment, a portion or portions of the tactility element 150 may also (or alternatively) pivot about the first end 154 when the push button 118 is pressed, due to the free-floating second end 158, and then return to a normal state after the user has released the push button 118, creating a tactile response.

In some embodiments, the tactility element 150 is simply supported on the first and second ends 154, 158, or at one or more locations between the first and second ends 154, 158. In yet other embodiments, one or more of the first and second ends 154, 158 is fixed, or is free floating. In some embodiments, radio frequency conditions or operations of the tactility element 150 may vary (e.g., to provide feed, ground, extend, etc.). Other embodiments include various other arrangements for supporting and accommodating the tactility element 150, as well as for providing radio frequency conditions or operations of the tactility element 150.

With reference to FIGS. 4-9, when a user's finger (for example a thumb as illustrated in FIGS. 4 and 7) is on the push button 118 and presses on the push button 118, the presence of the user's finger may tend to cause the tactility element 150 to detune, particularly when a frequency of the tactility element 50 is below 2 GHz (for example when the tactility element 50 is used as an antenna for GPS purposes, and the GPS frequency is below 2 GHz). To avoid or reduce the detuning, the tactility element 150 includes a first surface 152 and a second, opposite surface 156. The first surface 152 faces the push button 118 and is contacted by the lower projection 146 of the push button 118 when the push button 118 is pressed. The second surface 156 faces the printed circuit board 174. In some embodiments, the second side 156 includes a projection that extends toward the printed circuit board 174. The second side 156 is spaced from the printed circuit board 174 in a first operating state, for example when the push button 118 has not been pressed. The second side 156 is in physical contact with or is within a specified distance of a switch 164 (for example a microswitch) on the printed circuit board 174 in a second operating state, for example when the push button 118 has been pressed. The switch 164 is a tuning port associated with a tuning circuit 168 (illustrated in FIG. 9) on the printed circuit board 174. The switch 164 may be a microswitch, a touchless sensor (for example optical, magnetic), a switch similar to the one discussed above where the tactility element 50 serves as the conductive filament, and the like. In other embodiments the projection instead extends from the printed circuit board 174, and the second side 156 is pressed via the push button 118 into contact with or in close proximity to the projection and the switch 164 thereon. In some embodiments, the switch 164 includes a shunt lumped element.

Figure 9:
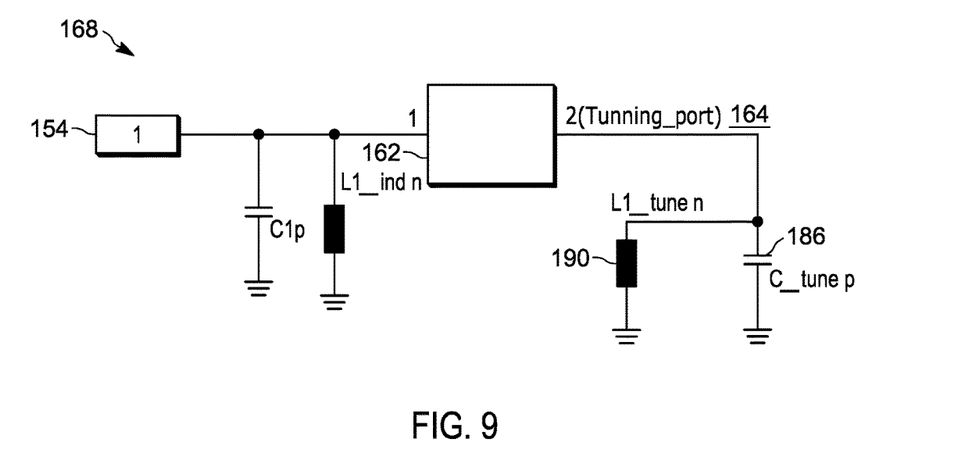
FIG. 9 illustrates a tuning circuit for the portable communications device of FIG. 4.

As illustrated in FIG. 9, the tuning circuit 168 includes at least one capacitor 186 and at least one inductor 190 (for example an "LC circuit") that together work to re-tune and re-match a response of the tactility element 150 back to its original and/or intended frequency (for example back to an original GPS frequency) when the switch 164 is activated. While one particular tuning circuit 168 is illustrated in FIG. 9, other tuning circuits may also be used.

In some embodiments, a connection (for example an electrical connection) with the tuning circuit 168 is achieved with a separate, independent, self-contained switching element that is physically contacted (for example by a projection on the tactility element 150) or otherwise activated by the downwards deflection of the tactility element 150 (for example causing a light beam to be interrupted, causing a physical element to be moved, and the like).

Figure 10:
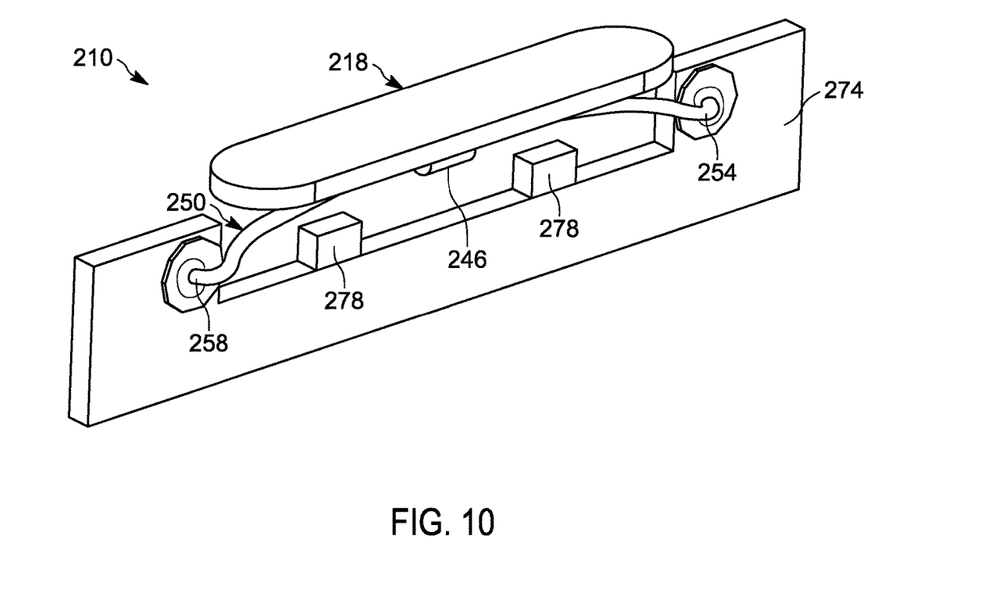
FIGS. 10 and 11 illustrate a push button and tactility element of a portable communications device in accordance with another embodiment.
Figure 11:
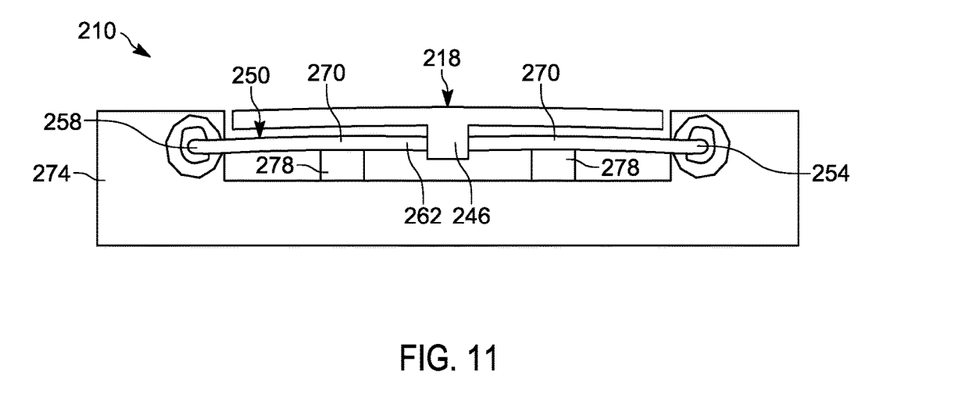

FIGS. 10 and 11 illustrate a portion of a portable communications device 210. While the portable communications device 210 is described and illustrated as a handheld two-way radio, the portable communications device 210 may be another type of portable communications device, including a cellular telephone, throwable camera, throwable microphone, radio frequency repeater, and the like.

With reference to FIGS. 10 and 11, the portable communications device 210 includes a housing (not shown) that defines an outer casing or covering (for example made of plastic or other rigid material). The portable communications device 210 further includes a push button 218 disposed along the housing. In some embodiments, the push button 218 is made at least partially of a flexible material (for example an elastomeric material such as an elastomeric rubber), such that at least a portion of the push button 218 may be pressed or otherwise moved from an initial resting position to a flexed position. As illustrated in FIGS. 10 and 11, the push button 218 includes a lower projection 246.

With continued reference to FIGS. 10 and 11, the portable communications device 210 further includes a tactility element 250 coupled to a printed circuit board 274. In the illustrated embodiment, the tactility element 250 is an antenna radiating element, and has a generally thin, elongate structure that forms an arched, tactile spring. The tactility element 250 includes a first end 254, a second, opposite end 258, and a central region 262 disposed between the first end 254 and the second end 258. The first end 254 is coupled directly to the printed circuit board 274 (for example via hard, gold-plated mounting points), and defines an antenna feed (for example to provide radio frequency signals to the tactility element 250). The second end 258 of the tactility element 250 is also coupled directly to the printed circuit board 274. The central region 262 passes through the lower projection 246, such that movement of the push button 218 generates corresponding movement of the central region 262 of the tactility element 250. Similar to the tactility elements 50 and 150, the tactility element 250 is a secondary antenna for a GPS system (or other system or component) of the portable communications device 210, and emits and/or receives radio frequency signals regardless of whether the push button 218 is pressed. In other embodiments, the tactility element 250 is an antenna radiating element that is used to supplement a primary antenna (similar to the primary antenna 66), or may operate in conjunction with other electronics components within the portable communications device 210.

With reference to FIG. 11, when the push button 218 is pressed, the tactility element 250 deflects, causing a tactile response to the user (for example in the form of tactile pressure or force). In the illustrated embodiment the central region 262 returns to its original position after the user removes his or her finger or fingers (for example the central region 262 "snaps" back). In other embodiments, the tactility element 250 may be designed to permanently collapse or otherwise deform after the user has pressed the push button 218 (for example with portable communications devices 210 that are throwable cameras, throwable microphones, or other one-use devices).

With continued reference to FIG. 11, the tactility element 250 includes at least one contact element 270 (e.g., electrical or mechanical). In the illustrated embodiment the tactility element 250 includes two contact elements 270 (for example portions of the tactility element 250 configured to contact the printed circuit board 274), one spaced on either side of the raised central region 262 of the tactility element 250. The printed circuit board 274 includes at least one corresponding contact element 278 (for example a raised electrical contact in the illustrated embodiment) that is aligned to contact the at least one contact element 270 of the tactility element 250 when the tactility element 250 has been deflected. When the contact elements 270, 278 meet, an electrical connection is formed (for example an electrical circuit may become closed, with the tactility element 250 acting as a filament for bridging two or more electrical contacts).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communications device comprising:
   a housing;
   a push button disposed along the housing; and
   an antenna radiating element disposed within the housing and spaced from the push button, wherein the antenna radiating element is configured to be contacted and deflected by the push button to provide a tactile response when the push button is pressed.

2. The portable communications device of claim 1, further comprising a printed circuit board, wherein the antenna radiating element has a first end and a second, opposite end, wherein the first end is permanently coupled to an antenna feed on the printed circuit board, and wherein the antenna feed is configured to provide radio frequency signals to the antenna radiating element.

3. The portable communications device of claim 2, wherein the second end is a floating end spaced from a ground plane of the printed circuit board.

4. The portable communications device of claim 2, wherein the antenna feed is configured to provide radio frequency signals to the antenna radiating element regardless of whether the push button is pressed.

5. The portable communications device of claim 1, wherein the antenna radiating element is a first antenna radiating element, wherein the portable communications device includes a second antenna radiating element.

6. The portable communications device of claim 1, wherein the antenna radiating element includes a first surface configured to be pressed by the push button, and a second, opposite surface, wherein at least one contact is disposed on the second surface.

7. The portable communications device of claim 6 further comprising a printed circuit board, wherein the contact is an electrical contact configured to electrically contact the printed circuit board when the push button is pressed.

8. The portable communications device of claim 6, further comprising a printed circuit board with an independent switching element, wherein the contact is a mechanical contact configured to physically interact with the independent switching element when the push button is pressed.

9. The portable communications device of claim 1, wherein the antenna radiating element is configured to momentarily collapse from a natural state when the push button is pressed, and is configured to re-assume the natural state when the push button is released.

10. The portable communications device of claim 1, wherein the antenna radiating element is configured to permanently collapse from a natural state when the push button is pressed.

11. The portable communications device of claim 1, further comprising a seal disposed around a periphery of the antenna radiating element.

12. The portable communications device of claim 1, wherein the push button is a push-to-talk button.

13. A portable communications device comprising:
   a housing;
   a printed circuit board disposed within the housing;
   a tactility element disposed within the housing, the tactility element having a first side and a second, opposite side, wherein the second side is spaced from the printed circuit board in a first operating state and operatively engages a tuning circuit on the printed circuit board in a second operating state.

14. The portable communications device of claim 13, wherein the tactility element is an antenna radiating element.

15. The portable communications device of claim 14, wherein the antenna radiating element has a first end and a second, opposite end, wherein the first end is coupled to an antenna feed on the printed circuit board, and wherein the antenna feed is configured to provide radio frequency signals to the antenna radiating element.

16. The portable communications device of claim 15, further comprising a push-to-talk button, wherein the antenna feed is configured to provide radio frequency signals to the antenna radiating element regardless of whether the push-to-talk button on the portable communications device is pressed.

17. The portable communications device of claim 14 wherein the antenna radiating element is a first antenna radiating element, wherein the portable communications device includes a second antenna radiating element.

18. The portable communications device of claim 13, further comprising a push button disposed along the housing, wherein the tactility element is disposed within the housing and spaced from the push button, and wherein the tactility element is configured to be moved by the push button from the first operating state to the second operating state when the push button is pressed.

19. The portable communications device of claim 13, wherein the projection is in direct electrical contact with a tuning circuit on the printed circuit board in the second operating state.

20. The portable communications device of claim 13, wherein the projection is in direct contact with an independent switching element in the second operating state.

* * * * *